(12) United States Patent
Li

(10) Patent No.: US 9,109,145 B2
(45) Date of Patent: Aug. 18, 2015

(54) STRIPPABLE ADHESIVE COMPOSITION AND USES THEREOF

(71) Applicant: CHI MEI CORPORATION, Tainan (TW)

(72) Inventor: Kuang-Chieh Li, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 0 days.

(21) Appl. No.: 14/215,770

(22) Filed: Mar. 17, 2014

(65) Prior Publication Data

US 2014/0296424 A1  Oct. 2, 2014

(30) Foreign Application Priority Data

Mar. 28, 2013  (TW) .............................. 102111041 A

(51) Int. Cl.
*C09J 153/00* (2006.01)
*C09J 153/02* (2006.01)

(52) U.S. Cl.
CPC .......... *C09J 153/00* (2013.01); *C09J 2203/326* (2013.01)

(58) Field of Classification Search
CPC .. C09J 147/00; C09J 153/02; C09J 2203/326; H05K 2203/1383; C08L 53/02
See application file for complete search history.

(56) References Cited

U.S. PATENT DOCUMENTS

2012/0207996 A1* 8/2012 Chapman et al. ............. 428/220
2014/0255638 A1* 9/2014 Imai et al. .................... 428/41.3

FOREIGN PATENT DOCUMENTS

| JP | 11-246801 A | 9/1999 |
| JP | WO 2013065417 A1 * | 5/2013 |
| TW | 201311834 A | 3/2013 |

OTHER PUBLICATIONS

Office action issued on Dec. 3, 2014 for the corresponding Taiwan, R.O.C. Patent Application No. 102111041.
English translation of the Search Report issued on Dec. 3, 2014 for the corresponding Taiwan, R.O.C. Patent Application No. 102111041.
English abstract translation of JP 11-246801 A.
English abstract translation of TW 201311834 A.

* cited by examiner

*Primary Examiner* — Brieann R Fink
(74) *Attorney, Agent, or Firm* — WPAT, P.C.; Anthony King

(57) ABSTRACT

The invention relates to a strippable adhesive composition, and it has the advantage of good stripability and coating. The invention also provides a strippable material and method for manufacturing the same and an electronic component and method for manufacturing the same.

14 Claims, No Drawings

STRIPPABLE ADHESIVE COMPOSITION AND USES THEREOF

BACKGROUND OF THE INVENTION

1. Field of the invention

The invention relates to a resin. Particularly, the invention relates a strippable adhesive composition and uses thereof. When applying the strippable adhesive composition in soldering an electrical device on a printed circuit board or in spraying or plating a printed circuit board, the strippable adhesive composition can protect the surface can be mechanically strippable and removal after the procedure.

2. Description of the Related Art

Generally, the strippable adhesive composition for protecting the surface when soldering the electronic device on the printed circuit board commonly has the following two major purposes: (1) in the flow soldering process (by directly contacting the printed circuit board with the molten solder bath), the strippable adhesive composition mainly protects the parts where the flux or solder are not easily attached, such as the terminal, contact, or variable resistor; (2) in the reflow soldering process (by welding with the melting solder at a high temperature after temporarily fixing the electronic device), in order to protect the wire part or terminal from oxidation, the strippable adhesive composition avoids the impedance increasing and the pollution of the contact materials caused by oxidized or carbonized surface of the metal such as copper and gold, even at the high temperature of welding. Furthermore, after such operations, the strippable adhesive composition can be easily stripped with the mechanical equipments such as clamps.

To achieve the aforementioned purposes, the thermoplastic type of strippable adhesive composition mainly comprising polyvinylchloride and a plasticizer are now widely used in the field. In the manufacturing the strippable adhesive composition, the polyvinylchloride powder is dispersed in the plasticizer to form a paste, the paste is coated on the desired part through wire screen printing or brushing, and then heated at 100° C. to 150° C. for a few minutes to several tens of minutes, and the a film by fusing polyvinylchloride and the plasticizer is obtained.

Among the various thermoplastic resins, although polyvinylchloride has good heat resistance and is inexpensive, it is accompanied by dehydrochlorination and then decomposition when exposed to 240° C. to 270° C. for a long period of time. Such phenomenon not only causes resin discoloration, but also causes burning-out on the circuit board due to increased hardness and brittle and difficult stripping.

To solve these problems, an optimized additive plasticizer or stabilizer is generally used. However, even the stability of the polyvinylchloride film is improved in this way, the stripability is still poor after heat treatment. Therefore, the stripping must be performed immediately after welding to avoid poor stripability.

In another aspect, the viscosity of the polyvinylchloride powder dispersed in the plasticizer is difficult to be controlled, and it leads poor coating properties such as uneven surfaces and irregular line when applying the composition by screen printing or brushing. Furthermore, the thin film obtained by the following heating step cannot meet the requirement in the modern field.

Therefore, overcoming the problems of poor stripability and coating properties to meet the current requirements is the target in the field of the present invention.

SUMMARY OF THE INVENTION

In the present invention, the specific resin is provided to obtain a strippable adhesive composition with good stripability and coating.

Therefore, the present invention provides a strippable adhesive composition comprising:
at least one block copolymer (A); and
a solvent (B);
wherein said at least one block copolymer (A) comprises a frame, and the frame comprises at least two vinyl aromatic polymer blocks and at least one hydrogenated and conjugated diene polymer block, and a hydrogenation ratio of the hydrogenated and conjugated diene polymer block is from 50 mol % to 100 mol %; and the solvent (B) comprises a cycloalkane organic solvent having 6 to 23 carbon atoms (B-1) and a naphthalene organic solvent (B-2).

The present invention also provides a method for producing a strippable material comprising coating the strippable adhesive composition as mentioned above on a substrate.

The present invention also provides a strippable material, which is obtained by the method as mentioned above.

The present invention further provides an electronic device, comprising the strippable material as mentioned above.

The present invention further provides a method for producing an electronic device, comprising the method as mentioned above for providing a strippable material.

DETAILED DESCRIPTION OF THE INVENTION

The invention relates to a strippable adhesive composition comprising:
at least one block copolymer (A); and
a solvent (B);
wherein said at least one block copolymer (A) comprises a frame, and the frame comprises at least two vinyl aromatic polymer blocks and at least one hydrogenated and conjugated diene polymer block, and a hydrogenation ratio of the hydrogenated and conjugated diene polymer block is from 50 mol % to 100 mol %; and the solvent (B) comprises a cycloalkane organic solvent having 6 to 23 carbon atoms (B-1) and a naphthalene organic solvent (B-2).

The at least one block copolymer (A) comprises a frame. The frame comprises at least two vinyl aromatic polymer blocks and at least one hydrogenated and conjugated diene polymer block.

Preferably, the vinyl aromatic polymer block is prepared by polymerizing a vinyl aromatic monomer. The vinyl aromatic monomer is selected from one or more compounds of (1) unsubstituted or alkyl-substituted styrene compounds: styrene, 2-methylstyrene, 3-methylstyrene, 4-methylstyrene, 4-ethylstyrene, 4-t-butylstyrene, 2,4-dimethylstyrene, α-methylstyrene, α-methyl-4-methylstyrene; and (2) halogen-substituted styrene compounds: 2-chlorostyrene, 4-chlorostyrene.

Preferably, the conjugated diene polymer block is prepared by polymerizing a conjugated diene monomer. The conjugated diene monomer is selected from one or more compounds of 1,3-butadiene, 2-methyl-1,3-butadiene, 2-methyl-1,3-isoprene, 2,3-dimethyl-1,3-butadiene, 1,3-pentadiene, and 1,3-hexadiene.

In one embodiment of the invention, the at least one block copolymer (A) can be synthesized by a process including the steps of (1) polymerization reaction: the vinyl aromatic monomer and the conjugated diene monomer are respectively dissolved in an organic solvent and a polymerization initiator is then added so as to initiate an anionic polymerization reaction to form a block copolymer precursor; and (2) hydrogenation reaction: the block copolymer precursor is hydrogenated in the presence of a hydrogenation catalyst to form the at least one block copolymer (A).

(1) Polymerization Reaction:

Preferably, the vinyl aromatic monomer and the conjugated diene monomer are respectively diluted with an organic solvent to a proper concentration before mixing and polymerizing these monomers. In the embodiment of the invention, the vinyl aromatic monomer and the conjugated diene monomer are respectively diluted to a concentration of 25 wt %.

Preferably, the organic solvent is selected from: (1) aliphatic compounds, such as n-butane, isobutane, n-pentane, n-hexane, n-heptane, n-octane, or the like; (2) cycloaliphatic compounds, such as cyclopentane, methylcyclopentane, cyclohexane, methylcyclohexane, cycloheptane, methylcycloheptane, or the like; or (3) combinations thereof. Aromatic compounds such as benzene, toluene, xylene, ethylbenzene, or the like can be used as the organic solvent for producing the block copolymer as long as the polymerization reaction is not negatively affected.

There is no specific limitation to the polymerization initiator. Commonly used organic alkaline metal compounds can be used as the polymerization initiator. Examples of the organic alkaline metal compounds include, but are not limited to, aliphatic alkaline metal compounds, aromatic alkaline metal compounds, organic amino alkaline metal compounds, or the like. Preferably, the polymerization initiator is selected from $C_1$-$C_{20}$ aliphatic lithium compounds, $C_6$-$C_{20}$ aromatic lithium compounds, $C_1$-$C_{20}$ aliphatic sodium compounds, $C_6$-$C_{20}$ aromatic sodium compounds, $C_1$-$C_{20}$ aliphatic potassium compounds, $C_6$-$C_{20}$ aromatic potassium compounds, or combinations thereof.

Examples of the $C_1$-$C_{20}$ aliphatic lithium compounds include, but are not limited to, n-propyl lithium, n-butyl lithium, sec-butyl lithium, tert-butyl lithium, hexamethylene dilithium, butadienyl dilithium, and isopentadienyl dilithium. Examples of the $C_6$-$C_{20}$ aromatic lithium compounds include, but are not limited to, a reaction product of diisopropenyl benzene and sec-butyl lithium, and a reaction product of divinyl benzene, sec-butyl lithium, and a minor amount of 1,3-butadiene. Additionally, the organic alkaline metal compounds disclosed in U.S. Pat. No. 5,708,092, UK Patent No. 2,241,239, and U.S. Pat. No. 5,527,753 can be used. The aforesaid examples of the polymerization initiator may be used alone or in admixture of two or more.

The polymerization temperature ranges preferably from −10° C. to 150° C., and more preferably from 40° C. to 120° C. The polymerization time can be adjusted according to the polymerization temperature, and is preferably no more than 10 hours, and more preferably from 0.5 hour to 5 hours. Preferably, the polymerization reaction is conducted under an inert atmosphere, such as a nitrogen atmosphere. There is no specific limitation to polymerization pressure as long as the vinyl aromatic monomer, the conjugated diene monomer, and the solvent are maintained at a liquid state at the polymerization temperature. It should be noted that impurities (for example, water, oxygen, carbonic acid gas, or the like) rendering the polymerization initiator and living polymer inert should not be present in the polymerization reaction.

(2) Hydrogenation Reaction:

There is no specific limitation to the hydrogenation catalyst. The following commonly used catalyst can be used in the present invention: (1) a supported type heterogeneous hydrogenation catalyst in which a metal is supported on a porous inorganic material; (2) a Ziegler type hydrogenation catalyst using an organic acid salt or a transition metal salt and a reducing agent; (3) organic metal compounds; (4) organic metal complexes; or the like.

Examples of the hydrogenation catalyst include, but are not limited to, (1) a supported type heterogeneous hydrogenation catalyst in which a metal such as Ni, Pt, Pd or Ru is supported on a carbon, silica, alumina, diatomaceous earth or the like; (2) a Ziegler type hydrogenation catalyst using an organic acid salt of Ni, Co, Fe, Cr or the like or a transition metal salt such as an acetylacetone salt and a reducing agent such as an organoaluminum; (3) an organic metal compound of Ti, Ru, Rh, Zr or the like; and (4) an organic metal complex of Ti, Ru, Rh, Zr or the like. As for the hydrogenation catalysts, the hydrogenation catalysts described in JP-B-S42-8704, JP-B-S43-6636, JP-B-S63-4841, JP-B-H1-37970, JP-B-H1-53851, and JP-B-H2-9041 may be used. Preferred examples of the hydrogenation catalysts include an organic metal complex of titanocene, a reducing organic metal compound, or a combination thereof.

As for the organic metal complex of titanocene, the complexes described in JP-A-H8-109219 may be used. Specific examples thereof include a complex having at least one ligand having a (substituted) cyclopentadienyl skeleton, an indenyl skeleton or a fluorenyl skeleton, such as biscyclopentadienyltitanium dichloride or monopentamethylcyclopentadienyltitanium trichloride. Further, examples of the reducing organic metal compounds include, but are not limited to, an organic alkali metal compound such as an organolithium, an organomagnesium compound, an organoaluminum compound, an organoboron compound, an organozinc compound, or the like.

Preferably, the hydrogenation reaction is generally conducted within the temperature range of 0° C. to 200° C., more preferably 30° C. to 150° C. The pressure of hydrogen used in the hydrogenation reaction is preferably from 0.1 MPa to 15 MPa, more preferably from 0.2 MPa to 10 MPa, and most preferably from 0.3 MPa to 7 MPa. The hydrogenation reaction time is preferably from 3 minutes to 10 hours, and more preferably from 10 minutes to 5 hours. In the hydrogenation reaction, any one of a batch process, a continuous process and a combination thereof can be used.

The hydrogenation ratio of the hydrogenated and conjugated diene polymer block can be adjusted by the temperature of the hydrogenation reaction, the pressure of the hydrogenation reaction, the hydrogenation reaction time, the used amount of the hydrogen, and the type of the hydrogenation reaction without specific limitation.

The hydrogenation ratio of the hydrogenated and conjugated diene polymer block according to the invention is from 50 mol % to 100 mol %; preferably, the hydrogenation ratio of the hydrogenated and conjugated diene polymer block is from 60 mol % to 100 mol %; more preferably, the hydrogenation ratio of the hydrogenated and conjugated diene polymer block is from 70 mol % to 100 mol %.

If the hydrogenation ratio of the hydrogenated and conjugated diene polymer block is less than 50 mol %, the stripability is poor.

Preferably, the vinyl aromatic polymer blocks contained in the at least one block copolymer (A) is in an amount ranging preferably from 15 wt % to 60 wt %, more preferably from 18 wt % to 57 wt %, and most preferably from 20 wt % to 55 wt %, based on 100 wt % of the at least one block copolymer (A).

Preferably, the at least one block copolymer (A) has a number average molecular weight ranging preferably from 50,000 to 100,000, more preferably from 52,000 to 98,000, and most preferably from 55,000 to 95,000.

If the at least one block copolymer (A) is absent, the strippability is poor.

The strippable adhesive composition according to the invention comprises the solvent (B). The choice of solvent (B) depends on the condition of drying the strippable adhesive composition at room temperature. Preferably, the solvent (B) comprises a cycloalkane organic solvent having 6 to 23 carbon atoms (B-1) and a naphthalene organic solvent (B-2).

Examples of the cycloalkane organic solvent having 6 to 23 carbon atoms (B-1) are cyclohexane, methyl cyclohexane, ethyl cyclohexane, propyl cyclohexane, n-butyl cyclohexane, 2-methylpropyl cyclohexane, 2-cyclohexyloctane, 9-cyclohexylheptadecane, 1,2-dicyclohexylethane, and 1,1-dicyclohexyltetradecane. The above-mentioned cycloalkane organic solvent having 6 to 23 carbon atoms can be used alone or in combinations.

Examples of the naphthalene organic solvent (B-2) are 1-methylnaphthalene, dimethylnaphtalene, 1-phenylnaphthalene, 1-chloronaphthalene, and 1-bromo-2-methylnaphthalene; preferably are 1-methylnaphthalene or 1-phenylnaphthalene. The above-mentioned naphthalene organic solvent can be used alone or in combinations.

In one preferred embodiment of the invention, the solvent (B) comprises an other solvent (B-3). The other solvent (B-3) is a ketone solvent such as acetone and methyl ethyl ketone; an aromatic solvent such as toluene and xylene; an ester solvent such as ethyl acetate, butyl acetate, and isopropyl acetate; an alcohol solvent such as ethanol and butanol; a petroleum solvent such as paraffin oil, naphthene oil, mineral turpentine, naphtha, DSP 80/100 (manufactured by Exxon Mobil), IP-1016 (manufactured by Japan's Idemitsu Kosan Co., Ltd.) and other petroleum based solvents.

If the cycloalkane organic solvent having 6 to 23 carbon atoms (B-1) and the naphthalene organic solvent (B-2) are not used at the same time, the coating is poor.

In one embodiment of the invention, based on 100 parts by weight of the used amount of the at least one block copolymer (A), the used amount of the solvent (B) is from 90 to 1000 parts by weight; preferably from 110 to 800 parts by weight; more preferably from 130 to 600 parts by weight; the used amount of the cycloalkane organic solvent having 6 to 23 carbon atoms (B-1) is from 60 to 600 parts by weight; preferably from 70 to 550 parts by weight; more preferably from 80 to 500 parts by weight; the used amount of the naphthalene organic solvent (B-2) is from 30 to 300 parts by weight; preferably from 40 to 250 parts by weight; more preferably from 50 to 200 parts by weight.

In one embodiment of the invention, a ratio of the cycloalkane organic solvent having 6 to 23 carbon atoms (B-1) to the naphthalene organic solvent (B-2) in the solvent (B) is from 0.5 to 10; preferably, the ratio of the cycloalkane organic solvent having 6 to 23 carbon atoms (B-1) to the naphthalene organic solvent (B-2) in the solvent (B) is from 0.7 to 8; more preferably, the ratio of the cycloalkane organic solvent having 6 to 23 carbon atoms (B-1) to the naphthalene organic solvent (B-2) in the solvent (B) is from 1 to 6. If the ratio of the cycloalkane organic solvent having 6 to 23 carbon atoms (B-1) to the naphthalene organic solvent (B-2) in the solvent (B) is from 0.5 to 10, the coating is better.

The strippable adhesive composition according to the invention preferably further comprises an additive (C), such as a filler, a modifier, a defoaming agent, a colorant, an adhesive agent, an antistatic agents, or a leveling agent. Examples of the filler are silicon oxide, magnesium oxide, aluminum hydroxide, aluminum oxide, aluminium nitride, boron nitride, and calcium carbonate, and preferably the filler is powder. Examples of the modifier are manganese naphthenate and the like and metal salts such as manganese octanate. Examples of the defoaming agent are silicone oil, fluorine oil, and polycarboxylic acid polymers. Examples of the colorant are inorganic pigments, organic pigments, organic dyes and the like. Examples of the organic pigments are C. I. Pigment B1, 2, 15, 15:3, 15:4, 15:6, 16, 22, 60, 66; C. I. Pigment C1, 7. Examples of the antistatic agent are a cationic antistatic agent, an anionic antistatic agent or a non-ionic antistatic agent. The cationic antistatic agent is exampled as the following: amidine salt, guanidine salt and quaternary ammonium salt and the like. The anionic antistatic agent is exampled as the following: sulfonate (C10 or higher and Mn 1,000 or less, such as sodium lauryl sulfonate, polyvinyl sulfonate), sulfate (C10 to 25, such as lauryl sulfate, EO 3 mol adduct of lauryl sulfate) phosphate (C10 to 25, such as octyl phosphate, EO 3 molar adduct of lauryl phosphate) and the like. The non-ionic antistatic agent is exampled as the following: EO adduct of higher alcohols (C8 to 24, such as oleyl alcohol, lauryl alcohol and stearyl alcohol), PEG fatty acid esters, fatty acid ester of polyhydric (bi to tri or more) alcohol (GR, PE, sorbitol (hereinafter referred to as SO), and sorbitol). Examples of the leveling agent are polyether modified polydimethylsiloxane copolymer, polyester modified polydimethylsiloxane copolymer, polyether modified polymethylalkylsiloxane copolymer, and aromatic alkyl modified polymethylalkylsiloxane copolymer.

In one embodiment of the invention, based on 100 parts by weight of the used amount of the at least one block copolymer (A), the used amount of the additive (C) is from 0.1 to 10 parts by weight; preferably from 0.5 to 9 parts by weight; more preferably from 1 to 8 parts by weight.

In one preferred embodiment of the invention, a method for producing the strippable adhesive composition according to the invention comprises dispersing the aforementioned block copolymer (A) and the optional additives (C) in the solvent (B), and stirring for 3 to 24 hours in a mixer to dissolve the solids to form the strippable adhesive composition. In general, the viscosity of the strippable adhesive composition can be adjusted by artisans skilled in this field according to the coating, volatility and other properties. When the viscosity of the strippable adhesive composition is 0.1 to 30 Pa·S, the strippable adhesive composition has a better coating property; preferably, the viscosity is 0.1 to 20 Pa·S; more preferably, 0.1 to 10 Pa·S.

The present invention also provides a method for producing a strippable material comprising coating the strippable adhesive composition as mentioned above on a substrate. Preferably, the substrate is an electronic component.

According to the invention, the electronic component suitable for the treatment with the strippable adhesive composition includes but is not limited to a circuit board equipped with microprocessors, transistors, capacitors, resistors, relays, or transformers, wherein the circuit board has patterns of lead wires or wire harness in need of the treatment.

According to the present invention, the treatment of the electronic component with the strippable adhesive composition can be a known coating procedure, such as dipping, brush coating, spray coating, and dispenser coating. In one preferred embodiment of the invention, the electronic component is further dried at 20 to 80° C. after coating to obtain the electronic device according to the invention.

The present invention also provides a strippable material, which is obtained by the method as mentioned above.

The present invention further provides an electronic device, comprising the strippable material as mentioned above.

The present invention further provides a method for producing an electronic device, comprising the method as mentioned above for providing a strippable material.

The following examples are given for the purpose of illustration only and are not intended to limit the scope of the present invention.

EXAMPLE

Preparation of Block Copolymer (A)

The hydrogenation catalyst used in the following examples for preparing the block copolymer was prepared as follows. Into a reactor under a nitrogen atmosphere, purified dry cyclohexane (1 L) and bis(η5-cyclopentadiene)titanium dichloride (100 mmol) were added. An n-hexane solution of trimethylaluminum (200 mmol) was then added while stirring to obtain a reaction solution, which was subjected to react at room temperature for 3 days to obtain a hydrogenation catalyst.

Synthesis Example 1

Into an autoclave equipped with a stirrer, a cyclohexane solution of styrene (10 parts by weight), n-butyl lithium (0.13 part by weight), and tetramethylethylenediamine (0.05 part by weight, as a randomizer) were added under a nitrogen atmosphere. Polymerization reaction was conducted at 70° C. for 20 minutes. A cyclohexane solution of styrene (20 parts by weight) and 1,3-butadiene (50 parts by weight) was added into the autoclave over 50 minutes. The polymerization reaction was conducted at 70° C. for further 5 minutes. A cyclohexane solution of styrene (10 parts by weight) was then added, and the polymerization reaction was conducted at 70° C. for further 25 minutes for further 25 minutes to obtain a reaction solution containing block copolymer precursor. The prepared hydrogenation catalyst and hydrogen were added into the reaction solution. The hydrogenation catalyst was in an amount of 100 ppm part by weight and the hydrogen was in an amount of 1.1 part by weight based on 100 parts by weight of the block copolymer precursor. Hydrogenation reaction was conducted at 65° C. under at a pressure 0.7 MPa. Methanol and oatadecyl-3-(3,5-di-tert-butyl-4-hydroxyphenyl)propionate (0.3 part by weight based on 100 parts by weight of the block copolymer precursor) were added. A block copolymer (A-1) was obtained after the solvent was removed. The hydrogenation ratio of the block copolymer (A-2) is 50%.

Synthesis Examples 2 to 8

Synthesis Examples 2 to 8 were conducted in a manner identical to that of Synthesis Example 1 using the amounts of the vinyl aromatic monomers, the conjugated diene monomers, and the hydrogenation catalysts shown in Table 1.

Synthesis Example 9

Into an autoclave equipped with a stirrer, a cyclohexane solution of styrene (20 parts by weight), n-butyl lithium (0.13 part by weight), and tetramethylethylenediamine (0.05 part by weight, as a randomizer) were added under a nitrogen atmosphere. Polymerization reaction was conducted at 70° C. for 20 minutes. A cyclohexane solution of 1,3-butadiene (60 parts by weight) was added into the autoclave over 50 minutes. The polymerization reaction was conducted at 70° C. for further 5 minutes. A cyclohexane solution of styrene (20 parts by weight) was then added, and the polymerization reaction was conducted at 70° C. for further 25 minutes. A block copolymer (A-9) was obtained after the solvent was removed.

TABLE 1

Preparation of Block copolymer (A)

| Synthesis Example | Block copolymer (A) | Structure of block copolymer (A) | Feeding ratio of the monomers for block copolymer (wt %) | Hydrogenation reaction | | | | |
|---|---|---|---|---|---|---|---|---|
| | | | | Used amount of hydrogen (wt %) | temperature (° C.) | pressure (MPa) | time (hour) | hydrogenation ratio (wt %) |
| 1 | A-1 | S-S/B-B-S | 10-20/50-10-10 | 1.1 | 65 | 0.7 | 1.0 | 50 |
| 2 | A-2 | S-B-S | 15-65-20 | 1.5 | 70 | 0.6 | 1.5 | 63 |
| 3 | A-3 | S-S/B-B-S | 15-15/30-30-10 | 1.7 | 80 | 0.5 | 2.0 | 77 |
| 4 | A-4 | S-B-S | 30-65-5 | 2.0 | 90 | 0.7 | 1.0 | 85 |
| 5 | A-5 | S-S/B-B-S | 20-5/25-35-15 | 2.2 | 80 | 0.6 | 3.0 | 100 |
| 6 | A-6 | S-B-S | 10-65-25 | 0.2 | 80 | 0.5 | 1.0 | 10 |
| 7 | A-7 | S-S/B-B-S | 10-10/40-20-20 | 0.9 | 70 | 0.6 | 2.0 | 42 |
| 8 | A-8 | S-B | 30-70 | 1.0 | 60 | 0.7 | 3.0 | 40 |
| 9 | A-9 | S-B-S | 20-60-20 | 0.0 | — | — | — | 0 |

S: styrene polymer block
B: butadiene polymer block
S/B: styrene/butadiene copolymer block
Strippable adhesive composition Example 1

100 parts by weight of the aforementioned block copolymer (A-1), 60 parts by weight of the cycloalkane organic solvent having 6 to 23 carbon atoms (B-1-1), 300 parts by weight of the naphthalene organic solvent (B-2-1), 0.1 parts by weight of the additives (C-1) shown in Table 2 was stirred for 16 hours in a mixer to dissolve the solids to form the strippable adhesive composition. The strippable adhesive composition is assayed according to the methods described below, and the results are shown in Table 2.

Examples 2 to 10

The preparations are similar to that of Example 1 with modifications of the kinds and amounts of the block copolymer (A-1), the cycloalkane organic solvent having 6 to 23 carbon atoms (B-1-1), the naphthalene organic solvent (B-2-1), and the additives (C-1). The compositions and the results of the assays are shown in Table 2.

Comparative Examples 1 to 7

The preparations are similar to that of Example 1 with modifications of the kinds and amounts of the block copolymer (A-1), the cycloalkane organic solvent having 6 to 23 carbon atoms (B-1-1), the naphthalene organic solvent (B-2-1), the additives (C-1). The compositions and the results of the assays are shown in Table 3.

Assays

Coating

The strippable adhesive composition was coated on a 100 mm×100 mm of rectangular glass substrate to form an 80 mm×80 mm of coating film with a screen printing machine (manufactured by Dongwon Unitech system, AT-45PA). The surface was observed. The criteria of the assay are shown blow:

⊚: flat after coating without irregular lines
○: flat after coating with few irregular lines
Δ: flat after coating with lots irregular lines
×: unflat after coating with lots irregular lines Stripability The strippable adhesive composition is coated on a 100 mm×100 mm of rectangular glass substrate to form an 80 mm×80 mm of coating film with a blade coater (ZAA-2300 manufactured by Chuan Hua Corporation). The coating film is heated for removing (drying) the volatile component to form a hardened film. The heating condition is using a hot plate at 120° C. for 20 minutes. When the heating process is completed, the coating film is quickly pulled up along the direction perpendicular to the substrate at a rate of 10 cm/s. The criteria of the assay are shown blow:

⊚: the film is pulled up completely without breakage and no residues remain on the substrate
○: the film is pulled up completely without breakage and small amounts of residues remain on the substrate
Δ: the film is pulled up without breakage and large amounts of residues remain on the substrate
X: the film is pulled up with breakage and large amounts of residues remain on the substrate

TABLE 2

Examples of the strippable adhesive composition

| Content | | | Example 1 | 2 | 3 | 4 | 5 | 6 | 7 | 8 | 9 | 10 |
|---|---|---|---|---|---|---|---|---|---|---|---|---|
| Block copolymer (A) (parts by weight) | | A-1 | 100 | | | | | | | | 100 | |
| | | A-2 | | 100 | | | | 30 | | 70 | | 100 |
| | | A-3 | | | 100 | | | 70 | 50 | 30 | | |
| | | A-4 | | | | 100 | | | 50 | | | |
| | | A-5 | | | | | 100 | | | | | |
| | | A-6 | | | | | | | | | | |
| | | A-7 | | | | | | | | | | |
| | | A-8 | | | | | | | | | | |
| | | A-9 | | | | | | | | | | |
| Solvent (B) (parts by weight) | cycloalkane organic solvent having 6 to 23 carbon atoms (B-1) | B-1-1 | 60 | | | | 250 | | | | 60 | |
| | | B-1-2 | | 100 | | | | 150 | | | | 600 |
| | | B-1-3 | | | 200 | | | 150 | 300 | | | |
| | | B-1-4 | | | | 300 | | | | 450 | | |
| | naphthalene organic solvent (B-2) | B-2-1 | 300 | | | | 100 | | | | 30 | |
| | | B-2-2 | | 200 | | | | 60 | | | | 250 |
| | | B-2-3 | | | 100 | | | | 30 | | | |
| | | B-2-4 | | | | 100 | 150 | | | 30 | | |
| | | B-3-1 | | | | | | | | | | 150 |
| | | B-3-2 | | | | | 50 | | | | | |
| additives (C) (parts by weight) | | C-1 | 0.1 | | | | 10 | | | | | |
| | | C-2 | | | | 2 | | | | | | |
| (B-1)/(B-2) weight ratio | | | 0.2 | 0.5 | 1.0 | 2.0 | 3 | 5 | 10 | 15 | 2 | 2 |
| Results of assay | coating | | ○ | ⊚ | ⊚ | ⊚ | ⊚ | ⊚ | ⊚ | ○ | ⊚ | ⊚ |
| | Stripability | | ⊚ | ⊚ | ⊚ | ⊚ | ⊚ | ⊚ | ⊚ | ⊚ | ⊚ | ⊚ |

B-1-1: Cyclohexane
B-1-2: Methylcyclohexane
B-1-3: Ethylcyclohexane
B-1-4: Propylcyclohexane
B-2-1: 1-methylnaphthalene
B-2-2: Dimethylnaphthalene
B-2-3: 1-phenyl naphthalene
B-2-4: 1-chloronaphthalene
B-3-1: Acetone
B-3-2: Toluene
C-1: Silicone Oil
C-2: Silica

TABLE 3

Comparative examples of the strippable adhesive composition

| | Content | | Comparative Example 1 | 2 | 3 | 4 | 5 | 6 | 7 |
|---|---|---|---|---|---|---|---|---|---|
| Block copolymer (A) (parts by weight) | | A-1 | | | | | | 50 | |
| | | A-2 | | | | | | 50 | |
| | | A-3 | | | | | | | |
| | | A-4 | | | | | | | 100 |
| | | A-5 | | | | | 100 | | |
| | | A-6 | 100 | | | | | | |
| | | A-7 | | 100 | | | | | |
| | | A-8 | | | 100 | | | | |
| | | A-9 | | | | 100 | | | |
| Solvent (B) (parts by weight) | cycloalkane organic solvent having 6 to 23 carbon atoms (B-1) | B-1-1 | 200 | | | | | | |
| | | B-1-2 | | 150 | | | | | |
| | | B-1-3 | | | | | 300 | | |
| | | B-1-4 | | | | | | | 300 |
| | naphthalene organic solvent (B-2) | B-2-1 | 100 | | | | | | |
| | | B-2-2 | | 150 | | | | | |
| | | B-2-3 | | | 300 | | | | |
| | | B-2-4 | | | | | | 300 | |
| | | B-3-1 | | | | | | | 300 |
| | | B-3-2 | | | | | | | |
| additives (C) (parts by weight) | | C-1 | | | | | | | |
| | | C-2 | | | | | | | |
| (B-1)/(B-2) weight ratio | | | 2 | 1 | 0 | — | 0 | — | — |
| Results of assay | coating | | ◎ | ◎ | X | X | X | X | X |
| | Stripability | | X | X | X | X | ◎ | ◎ | ◎ |

B-1-1: Cyclohexane
B-1-2: Methylcyclohexane
B-1-3: Ethylcyclohexane
B-1-4: Propylcyclohexane
B-2-1: 1-methylnaphthalene
B-2-2: Dimethylnaphthalene
B-2-3: 1-phenyl naphthalene
B-2-4: 1-chloronaphthalene
B-3-1: Acetone
B-3-2: Toluene
C-1: Silicone Oil
C-2: Silica While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A strippable adhesive composition comprising:
   at least one block copolymer (A); and
   a solvent (B);
   wherein said at least one block copolymer (A) comprises a frame, and the frame comprises at least two vinyl aromatic polymer blocks and at least one hydrogenated and conjugated diene polymer block, and a hydrogenation ratio of the hydrogenated and conjugated diene polymer block is from 50 mol % to 100 mol %; and the solvent (B) comprises a cycloalkane organic solvent having 6 to 23 carbon atoms (B-1) and a naphthalene organic solvent (B-2);
   wherein the cycloalkane organic solvent having 6 to 23 carbon atoms (B-1) is methyl cyclohexane, ethyl cyclohexane, propyl cyclohexane, n-butyl cyclohexane, 2-methylpropyl cyclohexane, 2-cyclohexyloctane, 9-cyclohexylheptadecane, 1,2-dicyclohexylethane, or 1,1-dicyclohexyltetradecane; and the naphthalene organic solvent (B-2) is 1-methylnaphthalene, dimethylnaphtalene, 1-phenylnaphthalene, 1-chloronaphthalene, or 1-bromo-2-methylnaphthalene;
   wherein a ratio of the cycloalkane organic solvent having 6 to 23 carbon atoms (B-1) to the naphthalene organic solvent (B-2) in the solvent (B) is from 1 to 6.

2. The strippable adhesive composition according to claim 1, wherein the hydrogenation ratio of the hydrogenated and conjugated diene polymer block is from 60 mol % to 100 mol % in the at least one block copolymer (A).

3. The strippable adhesive composition according to claim 1, wherein the hydrogenation ratio of the hydrogenated and conjugated diene polymer block is from 70 mol % to 100 mol % in the at least one block copolymer (A).

4. The strippable adhesive composition according to claim 1, based on 100 parts by weight of the used amount of the at least one block copolymer (A), the used amount of the solvent (B) is from 90 to 1000 parts by weight; the used amount of the cycloalkane organic solvent having 6 to 23 carbon atoms (B-1) is from 60 to 600 parts by weight; the used amount of the naphthalene organic solvent (B-2) is from 30 to 300 parts by weight.

5. A method for producing a strippable material comprising coating the strippable adhesive composition according to claim 1 on a substrate.

6. The method according to claim 5, wherein the substrate is an electronic component.

7. The method according to claim 5, wherein the hydrogenation ratio of the hydrogenated and conjugated diene polymer block is from 60 mol % to 100 mol % in the at least one block copolymer (A).

8. The method according to claim 5, wherein the hydrogenation ratio of the hydrogenated and conjugated diene polymer block is from 70 mol % to 100 mol % in the at least one block copolymer (A).

9. The method according to claim 5, based on 100 parts by weight of the used amount of the at least one block copolymer or hydrogenated copolymer thereof (A), the used amount of the cycloalkane organic solvent having 6 to 23 carbon atoms (B-1) is from 60 to 600 parts by weight; the used amount of the naphthalene organic solvent (B-2) is from 30 to 300 parts by weight.

10. A strippable material, which is obtained by the method according to claim 5.

11. An electronic device, comprising the strippable material according to claim 10.

12. A method for producing an electronic device containing an electronic component, comprising protecting the electronic component by coating the strippable adhesive composition according to claim 1 on the electronic component.

13. The method according to claim 12, wherein the electronic component comprises a circuit board equipped with microprocessors, transistors, capacitors, resistors, relays, or transformers.

14. A method for removing the strippable material according to claim 10, which method is mechanically stripping the strippable material.

* * * * *